United States Patent
Trieu

(10) Patent No.: US 9,778,884 B2
(45) Date of Patent: Oct. 3, 2017

(54) VIRTUAL STORAGE POOL

(71) Applicant: HEWLETT PACKARD ENTERPRISE DEVELOPMENT LP, Houston, TX (US)

(72) Inventor: Tan Trieu, San Jose, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 269 days.

(21) Appl. No.: 13/853,863

(22) Filed: Mar. 29, 2013

(65) Prior Publication Data

US 2014/0281355 A1    Sep. 18, 2014

Related U.S. Application Data

(60) Provisional application No. 61/780,292, filed on Mar. 13, 2013.

(51) Int. Cl.
*G06F 17/30* (2006.01)
*G06F 12/08* (2016.01)
*G06F 12/0808* (2016.01)
*G06F 12/0815* (2016.01)
*G06F 3/06* (2006.01)

(52) U.S. Cl.
CPC .......... *G06F 3/0683* (2013.01); *G06F 3/0605* (2013.01); *G06F 3/0644* (2013.01); *G06F 3/0665* (2013.01)

(58) Field of Classification Search
CPC .. G06F 12/00; G06F 12/0253; G06F 12/0817; G06F 12/084; G06F 12/1009
USPC ........................................................ 711/206
See application file for complete search history.

(56) References Cited

U.S. PATENT DOCUMENTS

| | | | |
|---|---|---|---|
| 6,782,410 B1* | 8/2004 | Bhagat | G06F 9/5027 709/201 |
| 6,842,377 B2* | 1/2005 | Takano | G11C 7/1021 365/185.21 |
| 7,017,011 B2* | 3/2006 | Lesmanne | G06F 12/082 711/141 |
| 7,196,942 B2* | 3/2007 | Khurana | G11C 7/1051 326/38 |
| 7,269,715 B2* | 9/2007 | Le | G06F 9/3802 712/215 |
| 7,321,955 B2* | 1/2008 | Ohmura | G06F 12/0804 711/113 |
| 7,512,736 B1* | 3/2009 | Overby | G06F 3/0607 707/999.202 |

(Continued)

*Primary Examiner* — Tuan Thai
*Assistant Examiner* — Mohamed Gebril
(74) *Attorney, Agent, or Firm* — Hewlett Packard Enterprise Development Patent Department

(57) ABSTRACT

Virtual storage pool creation is simplified by allowing a user to specify what devices to include in virtual storage pool by physical location. The virtual storage pool may be automatically generated based on the simplified user specifications. The user may specify the virtual pool configuration in a configuration file. A configuration application generates the virtual storage pool based on the configuration file. The configuration application utilizes the physical locations of block devices contained in the configuration file to generate the pool. As a result, virtual pool configuration and creation is automated, more efficient and is less error prone than previous methods that involve manually linking between physical device locations and computer generated names.

21 Claims, 6 Drawing Sheets

(56) References Cited

U.S. PATENT DOCUMENTS

| | | | | |
|---|---|---|---|---|
| 8,230,193 B2* | 7/2012 | Klemm | G06F 3/0608 | 711/114 |
| 8,566,546 B1* | 10/2013 | Marshak | G06F 3/0604 | 711/112 |
| 8,984,031 B1* | 3/2015 | Todd | G06F 17/30091 | 707/823 |
| 8,990,527 B1* | 3/2015 | Linstead | G06F 3/0617 | 711/161 |
| 2004/0068621 A1* | 4/2004 | Van Doren | G06F 12/0828 | 711/144 |
| 2005/0125607 A1* | 6/2005 | Chefalas | G06F 12/0862 | 711/113 |
| 2007/0008328 A1* | 1/2007 | MacWilliams | G06F 12/0646 | 345/530 |
| 2009/0094413 A1* | 4/2009 | Lehr | G06F 3/0605 | 711/112 |
| 2009/0228648 A1* | 9/2009 | Wack | G06F 11/1092 | 711/114 |
| 2009/0271472 A1* | 10/2009 | Scheifler | G06F 9/485 | 709/202 |
| 2009/0282101 A1* | 11/2009 | Lim | G06F 9/5077 | 709/203 |
| 2010/0046267 A1* | 2/2010 | Yan | G11C 16/24 | 365/51 |
| 2010/0050016 A1* | 2/2010 | Franklin | G06F 11/0727 | 714/6.32 |
| 2010/0125712 A1* | 5/2010 | Murase | G06F 11/1458 | 711/162 |
| 2010/0332780 A1* | 12/2010 | Furuya | G06F 3/0689 | 711/162 |
| 2011/0066668 A1* | 3/2011 | Guarraci | G06F 17/30233 | 707/831 |
| 2011/0202735 A1* | 8/2011 | Kono | G06F 11/1451 | 711/162 |
| 2011/0307745 A1* | 12/2011 | McCune | G06F 17/30221 | 714/54 |
| 2012/0131232 A1* | 5/2012 | Brownlow | G06F 13/4221 | 710/10 |
| 2012/0198107 A1* | 8/2012 | McKean | G06F 13/18 | 710/40 |
| 2013/0007373 A1* | 1/2013 | Beckmann | G06F 12/126 | 711/136 |
| 2013/0055253 A1* | 2/2013 | Jubran | G06F 9/455 | 718/1 |
| 2013/0067161 A1* | 3/2013 | Chandra | G06F 13/12 | 711/114 |
| 2013/0080805 A1* | 3/2013 | Vick | G06F 8/4432 | 713/320 |
| 2013/0086268 A1* | 4/2013 | Sloma | G06F 9/455 | 709/226 |
| 2013/0111129 A1* | 5/2013 | Maki | G06F 3/0611 | 711/117 |
| 2013/0152097 A1* | 6/2013 | Boctor | G06F 9/505 | 718/103 |
| 2013/0326270 A1* | 12/2013 | Chen | G06F 11/2089 | 714/6.21 |
| 2014/0003114 A1* | 1/2014 | Pellizzer | H01L 27/2481 | 365/63 |

* cited by examiner

```
# Option #2 Balanced Capacity /Performance
# One RAIDZ2 zpool with 8 vdevs of 8 disks each , 2xL2ARC, 2xSLOG
# Ideal for web hosting , file sharing , cloud computing .
name   = tank0
l2arc  = :1:8, :5:8
slog   = :3:8, :7:8
raidz2 = :0:0, :1:0, :2:0, :3:0, :4:0, :5:0, :6:0, :7:0
raidz2 = :0:1, :1:1, :2:1, :3:1, :4:1, :5:1, :6:1, :7:1
raidz2 = :0:2, :1:2, :2:2, :3:2, :4:2, :5:2, :6:2, :7:2
raidz2 = :0:3, :1:3, :2:3, :3:3, :4:3, :5:3, :6:3, :7:3
raidz2 = :0:4, :1:4, :2:4, :3:4, :4:4, :5:4, :6:4, :7:4
raidz2 = :0:5, :1:5, :2:5, :3:5, :4:5, :5:5, :6:5, :7:5
raidz2 = :0:6, :1:6, :2:6, :3:6, :4:6, :5:6, :6:6, :7:6
raidz2 = :0:7, :1:7, :2:7, :3:7, :4:7, :5:7, :6:7, :7:7
```

VIRTUAL STORAGE POOL

CROSS REFERENCE TO RELATED APPLICATIONS

This application claims the priority benefit of U.S. Provisional Application Ser. No. 61/780,292, titled "Virtual Storage Pool," filed Mar. 13, 2013, the disclosure of which is incorporated herein by reference.

BACKGROUND OF THE INVENTION

Field of the Invention

The presently claimed invention relates to virtual storage. More specifically, the claimed invention relates to creating virtual storage pools from multiple storage elements.

Description of the Related Art

Virtual storage pools are constructed from virtual devices and are used to help satisfy the growing storage requirements of many companies. Virtual devices are constructed from block devices that store data in blocks. Examples of block devices include hard drive partitions, files, and even entire hard drives, as well as other components.

Though useful when up and running, a virtual pool can be difficult to configure. Virtual storage pools are often distributed over several devices, and therefore require that each device is identified and associated with a virtual device and corresponding virtual pool. The actual block devices which make up each virtual device are tracked by an operating system of a server or controller and are generally referred to by computer generated addresses—typically a hexadecimal string of characters. When setting up a virtual storage pool, a user manually links physical drive locations to logical names presented by the operating system. The manual linking process involves accessing a list of all available block devices, such as hard drives expressed as a computer generated address, selecting one of the computer generated addresses to "blink" a particular drive (i.e., determine what drive corresponds to the computer generated address), and assigning the drive that blinks to a desired virtual storage pool.

When virtual pools are created from large numbers of block devices, it can be difficult and time consuming to create the manual "drive blinking" and the abstract computer generated addresses, and errors in virtual pool creation often result. What is needed is a more efficient method for creating virtual storage pools.

SUMMARY OF THE CLAIMED INVENTION

The present invention simplifies virtual storage pool creation by allowing a user to specify what devices to include in virtual storage pool by physical location. The virtual storage pool may be automatically generated based on the simplified user specifications. The user may specify the virtual pool configuration in a configuration file. A configuration application generates the virtual storage pool based on the configuration file. The configuration application utilizes the physical locations of block devices contained in the configuration file to generate the pool. As a result, virtual pool configuration and creation is automated, more efficient and less error prone than previous methods that involve manually linking between computer generated addresses and physical device locations.

In an embodiment, a virtual storage pool may be created by accessing a configuration file by a configuration application. The configuration application may be stored in memory. The configuration file may include block device information. A virtual storage pool may be automatically generated by the application. The virtual storage pool may be generated from block devices associated with the block device information.

In an embodiment, a system for creating a virtual storage pool may include a processor, a memory and one or more modules. The one or more modules may be stored in the memory and executable by the processor to access a configuration file and automatically generate a virtual storage pool. The configuration file may include block device information. The virtual storage pool may be generated from block devices associated with the block device information

BRIEF DESCRIPTION OF THE DRAWINGS

FIG. 4 is an illustration of a configuration file.

DETAILED DESCRIPTION

Creation of a virtual storage pool is made faster, easier, and less error prone by allowing a user to specify what block devices to include in the virtual storage pool by specifying their physical location. The virtual storage pool may be automatically generated based on a configuration file that includes the simplified user specifications. A configuration application may access the configuration file, translate the physical location information to an operating system-friendly format, and generate the virtual storage pool. By utilizing the physical locations of block devices contained in the configuration file to generate the pool, virtual pool configuration and creation is made easier, more efficient and less error prone than previous methods that involve manually linking between computer generated addresses and physical device locations.

Figure 1:
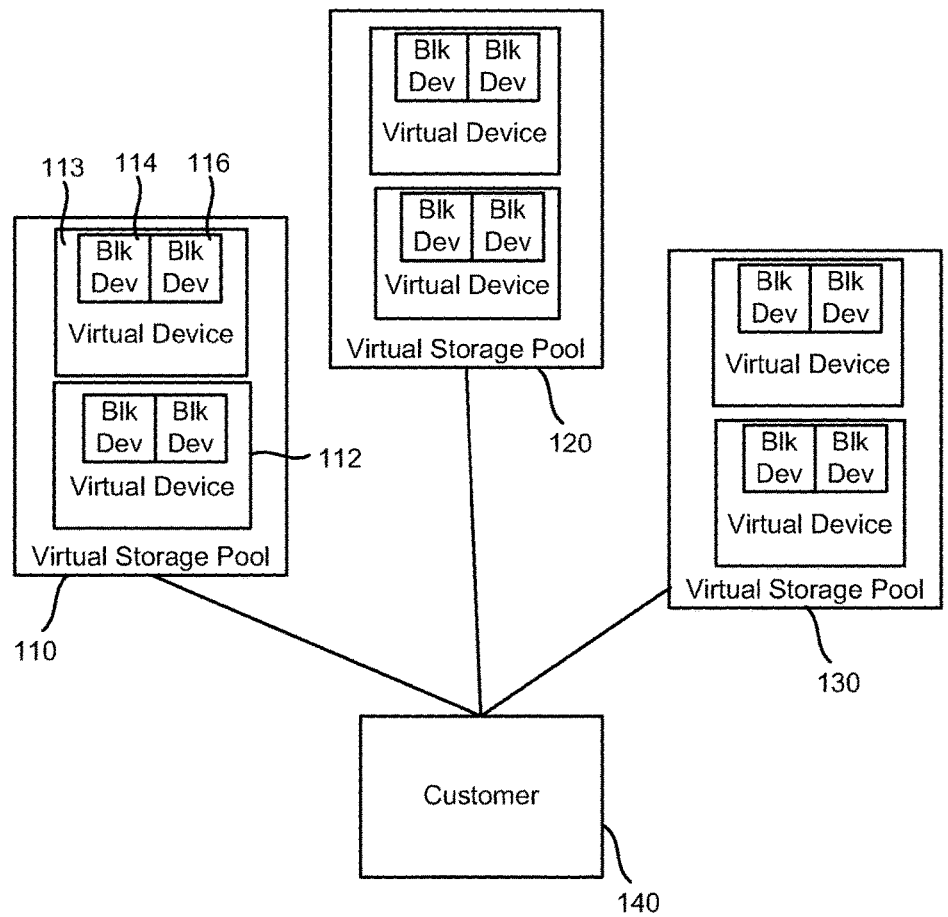
FIG. 1 is a block diagram of a virtual storage pools.

FIG. 1 is a block diagram of virtual storage pools. The system of FIG. 1 includes virtual storage pool 110, virtual storage pool 120, and virtual storage pool 130. Each of the virtual storage pools may be accessed by a customer 140. The customer 140 may store and access data from one or more of the virtual storage pools 110-130. The customer 140 may utilize a single machine, a series of machines, one or more networks, or some other configuration of entities that access one or more of the virtual storage pools.

In some embodiments, a virtual storage pool may be implemented in a "ZFS" combined file system and logical volume manager designed by Sun Microsystems. The ZFS file system may implement the virtual storage pool as a Z pool. For purposes of discussion, virtual pools will be referred to herein as virtual storage pools, but the scope of the present invention is intended to cover Z pools as well as other specific types of virtual storage pools.

The customer may "see" each virtual storage pool as a single volume, for example through a display device associated with their own computer which is communicatively coupled with the virtual storage pool over a network. However, each virtual storage pool may be created from many devices. For example, virtual storage pool 110 includes virtual devices 112 and 113. Each of virtual devices 112 and 113 includes one or more block devices. For example, virtual device 113 includes block device 114 and block device 116. Each block device may include one or more files, hard drive partitions, disk drives, entire hard drives, or any other device that provides storage of at least one "block" of data—a quantity of data that can be moved from device to device—that can be utilized by the virtual storage pool.

Each virtual device may include one or more block devices on one or more different machines. Each of virtual storage pools 120 and 130 are also made of one or more virtual devices having one or more block devices. Although each virtual storage pool is shown with two virtual devices, each having two block devices, a virtual storage pool may have any number of virtual devices, and each of which may have a different number of block devices.

Figure 2:
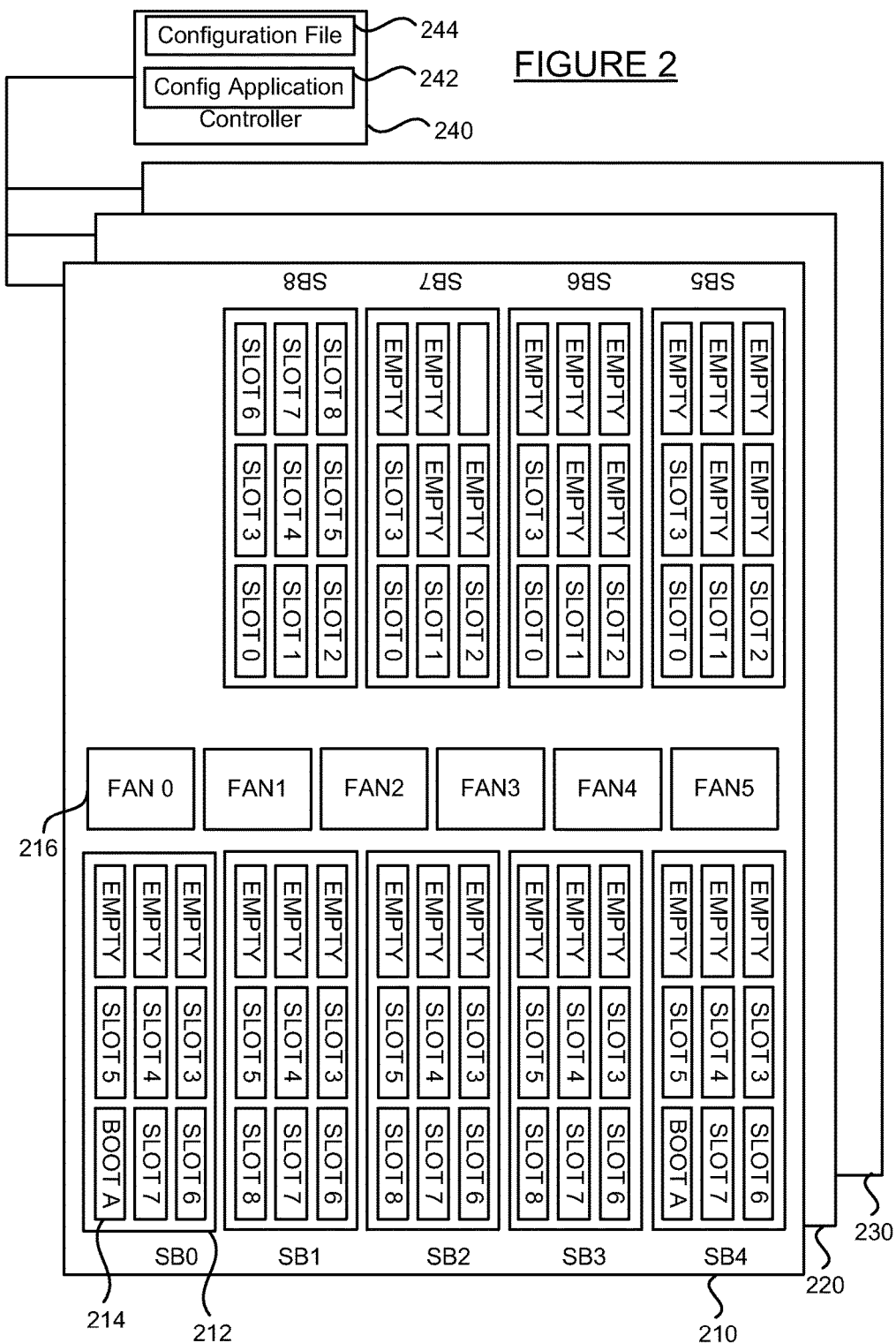
FIG. 2 is a block diagram of servers with devices used to form virtual storage pools.

FIG. 2 is a block diagram of servers with devices used to form virtual storage pools. FIG. 2 includes servers 210, 220 and 230 in communication with controller 240. Server 210 includes a number of sub-blocks or sub-server portions of storage. In the embodiment illustrated, server 210 includes nine sub-blocks of storage. Each sub-block may include one or more hard disk drives or other storage devices. The storage devices may include hard disk drives, flash drives, cache, optical drives, and other types of storage devices. In the embodiment illustrated, each sub-block includes nine disk drive units, such as disk drive unit 214. Server 210 may also include other devices commonly found in a storage chassis, such as one or more fans 216, cooling systems, processors, cache, and other components typically found in a server, most of which are not shown in FIG. 2 for purposes of explanation. Servers 210-230 may be located at the same physical location, such as in a data center, or distributed at different locations.

Controller 240 may communicate with and manage the storage systems included in servers 210-230. Controller 240 may include configuration application 242 and configuration file 244. Configuration application 242 may be an application stored in memory and executed by a processor to generate virtual storage pools from one or more configuration files. The configuration application may access a configuration file such as file 244, translate physical locations of block devices listed in the configuration file to operating system address information and generate the virtual storage pools based on the operating system information. In some embodiments, configuration application 242 may be implemented by an MKPRESET tool or other tool for generating a preset file.

In some embodiments, configuration application 242 may translate the physical device locations to information other than operating system address locations. When operating system commands are used to create the pools from operating system address locations, the block device physical locations may be translated to operating system address locations. When a protocol or format other than operating system commands are used to create the virtual storage pools, the block device physical locations may be translated to information that is compatible with the other protocol or format, such as hardware configuration language or API that communicates with servers 210-230.

Configuration file 244 may outline which block devices make up a virtual device, which virtual devices make up a volume, and may be created manually or with the assistance of a configuration file generation application. In some embodiments, configuration file 244 may be implemented as an MKPRESET file.

As illustrated in FIG. 2, each of the devices 214 within server 210 may be associated with a physical location. For example, each sub-block 212 is assigned a physical location, such as sub-block 0, sub-block 1, sub-block 2, and so forth on to sub-block 8. Within each sub-block, each device 214 may be associated with a slot. For example, sub-block 0 includes devices having locations of slot 3, slot 4, slot 5 and so forth on to slot 7. Sub-block 0 also includes three empty slots and one slot reserved for "Boot A."

Figure 3:
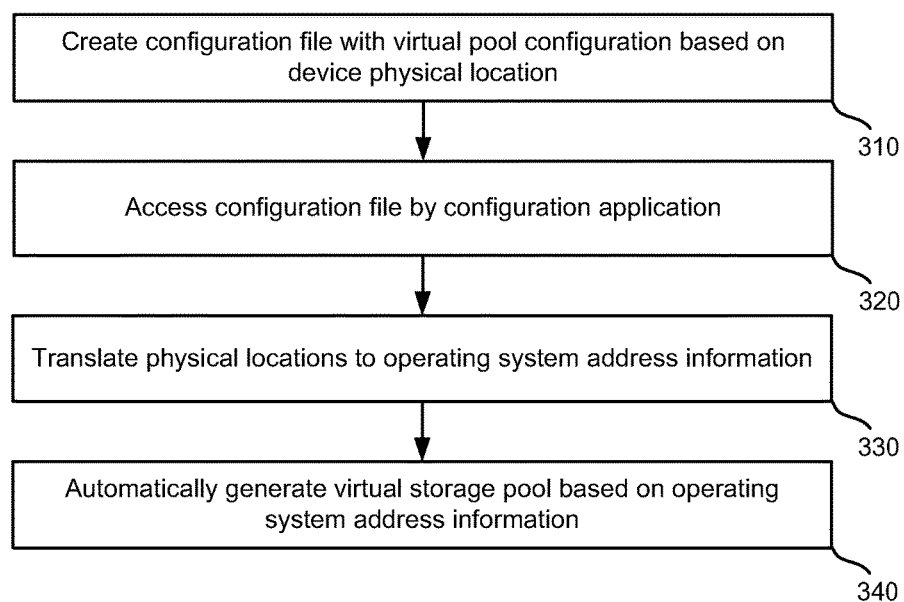
FIG. 3 is a method for generating a virtual storage pool.

FIG. 3 is a method for generating a virtual storage pool. In some embodiments, the method of FIG. 3 may be performed by controller 240. First, a configuration file may be created at step 310. The configuration file may include virtual pool configuration information based on device physical locations. The configuration file may be created manually, such as, for example, by manually typing up a text file. In other embodiments, the configuration file may be created with the help of an application, such as one that provides a user interface that shows available devices that are selectable for inclusion in a virtual device and virtual storage pool.

When selecting devices to form a virtual pool, several strategies may be considered based on design preference. For example, virtual devices may be formed such that the devices forming the virtual device are distributed, optimized for performance, fault tolerant, and accommodate heat and airflow constraints. An example of the configuration file is discussed in more detail below to respect of FIG. 4.

A configuration file may be accessed by a configuration application at step 320. Physical locations are then translated to operating system address information at step 330. In embodiments where information other than operating system address information is used to access the drives, the physical locations are translated to the other information.

The configuration application may access the physical locations listed in the configuration file and convert those locations to operating system address information that can be recognized by the operating system. In some embodiments, configuration application 240 may have access to a look up table or other information which it may utilize to translate device physical locations to operating system address information. The look up table or other translation information may be located locally in memory of controller 240 or at some remotely accessible location. The translation information may be created using available operating system analysis methods and operating system tools known in the art.

A virtual storage pool is generated based on the operating system address information at step 340. Generating the virtual storage pool involves assigning devices to virtual devices, and assigning the virtual devices to virtual storage pools as outlined in the configuration file. The virtual storage pool may be generated by the configuration application by the application issuing operating system commands to implement configuration data in the configuration file.

FIG. 4 is an illustration of a configuration file. The configuration file of FIG. 4 includes comment information, a virtual data storage volume name, cache information, and virtual device data for forming a virtual storage pool. The first three lines of configuration file 410 are comments, and have no functional effect. The fourth line of the configuration file indicates that the name of the current virtual data pool is "tank0".

The remainder of the lines in the configuration file communicates physical locations of devices. The configuration file uses a colon delineated string format to specify physical locations. The colon delineated string format includes tuples of server, sub-block, and slot separated by a colon. Hence, a physical location described as "1:6:2" would specify a server identified as server one, the sixth sub-block in server one, and the second slot in the sixth sub-block. In the embodiment illustrated in FIG. 4, a sever value is not included in any physical location tuples, indicating that all of the sub-blocks and slots are located in a single server. It is well known in the art that the other formats of representing physical locations may be used with the present technology, and the colon delineated string format is discussed herein for exemplary purposes.

The fifth line in the configuration file indicates that a device located at the first sub-block and eighth slot as well as the fifth sub-block and eighth slot will be used as a read cache. The next line indicates that the devices at the third sub-block and eighth slot and the seventh sub-block and eighth slot are used as a write cache.

The seventh through fourteenth lines in the configuration file specify types of virtual devices. Several types of virtual devices may be specified, including mirror devices, RAID Z1, RAID Z2, RAID Z3, cache, a spare device, a log, and other virtual device types. Configuration file 410 specifies that RAID zone two virtual devices will be used to form the virtual storage pool. For example, the first virtual device listed indicates that a RAID Z2 virtual device will include actual devices located at sub-block 0 and slot 0, sub-block 1 and slot 0, sub-block 2 and slot 0, sub-block 3 and slot 0, sub-block 4 and slot 0, sub-block 5 and slot 0, sub-block 6 and slot 0, and sub-block 7 and slot 0. Hence, the virtual device listed utilizes an actual device from each sub-block and the same slot within each sub-block.

Figure 5:
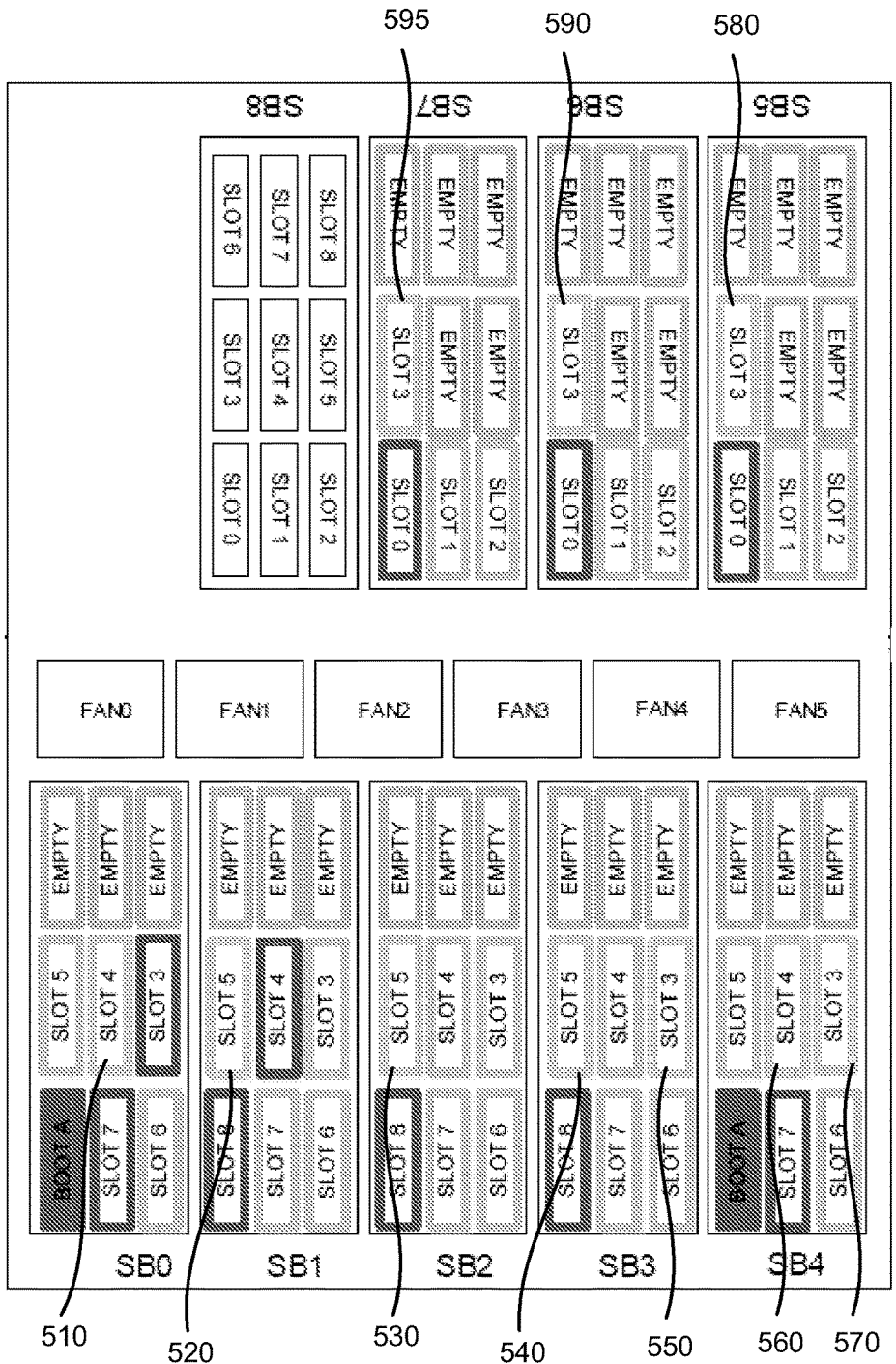
FIG. 5 is a block diagram of a server with devices forming different virtual storage pools.

FIG. 5 is a block diagram of a server with devices forming different virtual storage pools. In some embodiments, the block diagram of FIG. 5 provides information of the block diagram of server 210 of FIG. 2 after the server has been configured for a virtual storage pool. The markings of the physical locations within the sub-blocks is intended to convey how the devices at the physical locations within server 510 of FIG. 5 have been allocated to a virtual device. For example, one virtual device includes the memory devices 510 at sub-block 0 and slot 4, device 520 at sub-block 1 and slot 5, device 530 at sub-block 2 and slot 5, device 550 at sub-block 3 and slots 5, devices 560 and 570 at sub-block 4 and slots 4 and 3, device 580 at sub-block 5 and slot 3, device 590 at sub-block 6 and slot 3, and device 595 at sub-block 7 and slot 3.

Figure 6:
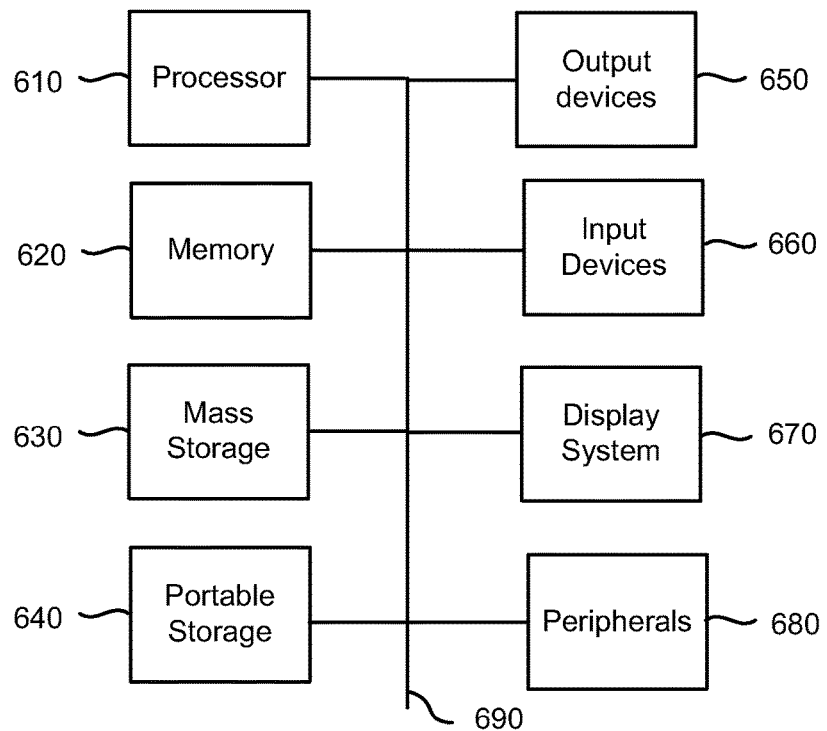
FIG. 6 is a block diagram of a computing device for implementing controller 240.

FIG. 6 is a block diagram of a computing device for implementing controller 240. System 600 of FIG. 6 may be implemented in the contexts of the likes of controller 240. The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a floppy disk, compact disk or Digital video disk, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for creating a virtual storage pool, comprising:
  receiving a selection that identifies a physical location of one or more block devices to include in the virtual storage pool originally identified via a user interface that shows one or more available devices that may be included in the virtual storage pool, wherein:
    the selection is received by a controller that communicates with a plurality of physical servers,
    the selection identifies a reference number of at least one physical server of the plurality of physical servers of a plurality of servers, the selection identifies a sub-block number that identifies a sub-block of one or more sub-blocks associated with the at least one physical server of the plurality of physical servers;

the selection identifies a slot number identifying a slot of one or more slots in the at least one physical server of the plurality of physical servers, and each of the one or more slots are associated with the physical location of the one or more block devices and the one or more slots corresponding to the one or more sub-blocks and one or more slot numbers within the one or more sub-blocks by the reference number of the physical server, the sub-block number that identifies the sub-block of the one or more sub-blocks, and the slot number of the one or more slots;

generating a configuration file that includes the selection identifying the at least one physical server of the plurality of physical servers and the selection of the one or more block devices as block device information that associates the physical location of the one or more block devices with the virtual storage pool;

accessing the configuration file by a configuration application stored in memory of a computing device, the configuration file including block device information; and automatically generating a virtual storage pool by the configuration application, wherein the virtual storage pool is generated from a plurality of block devices associated with the block device information and with the at least one physical server of the plurality of physical servers.

2. The method of claim 1, wherein the configuration file includes a physical location of a first block device of the plurality of block devices.

3. The method of claim 1, wherein the configuration file specifies the physical locations of each block device of the plurality of block devices in each virtual device.

4. The method of claim 1, wherein the configuration file specifies a type of virtual device.

5. The method of claim 1, further comprising translating the physical locations of each block device of the plurality of block devices to operating system addresses.

6. The method of claim 5, further comprising accessing a look-up table of operating system addresses based on block devices physical locations.

7. The method of claim 1, wherein the configuration application is executed by a controller in communication with multiple server devices.

8. A non-transitory computer readable non transitory storage medium having embodied thereon a program, the program being executable by a processor to perform a method for creating a virtual storage pool, the method comprising:

receiving a selection that identifies a physical location of one or more block devices to include in the virtual storage pool originally identified via a user interface that shows one or more available devices that may be included in the virtual storage pool, wherein:

the selection is received by a controller that communicates with a plurality of physical servers, the selection identifies a reference number of at least one physical server of the plurality of physical servers of a plurality of servers, the selection identifies a sub-block number that identifies a sub-block of one or more sub-blocks associated with the at least one physical server of the plurality of physical servers;

the selection identifies a slot number identifying a slot of one or more slots in the at least one physical server of the plurality of physical servers, and each of the one or more slots are associated with the physical location of the one or more block devices and the one or more slots corresponding to the one or more sub-blocks and one or more slot numbers within the one or more sub- blocks of a plurality of sub-blocks by the reference number of the physical server, the sub-block number that identifies the sub-block of the one or more sub-blocks, and the slot number of the one or more slots;

generating a configuration file that includes the selection identifying the at least one physical server of the plurality of physical servers and the selection of the one or more block devices as block device information that associates the physical location of the one or more block devices with the virtual storage pool;

accessing the configuration file, the configuration file including block device information; and automatically generating a virtual storage pool, wherein the virtual storage pool generated from a plurality of block devices associated with the block device information and with the at least one physical server of the plurality of physical servers.

9. The non-transitory computer readable storage medium of claim 8, wherein the configuration file includes a physical location of a first block device of the plurality of block devices.

10. The non-transitory computer readable storage medium of claim 8, wherein the configuration file specifies the physical locations of each block device of the plurality of block devices in each virtual device.

11. The non-transitory computer readable storage medium of claim 8, wherein the configuration file specifies a type of virtual device.

12. The non-transitory computer readable storage medium of claim 8, the method further comprising translating the physical locations of each block device of the plurality of block devices to operating system addresses.

13. The non-transitory computer readable storage medium of claim 12, the method further comprising accessing a look-up table of operating system addresses based on block devices physical locations.

14. The non-transitory computer readable storage medium of claim 8, wherein the configuration application is executed by a controller in communication with multiple server devices.

15. A system for creating a virtual storage pool, comprising:

a plurality of physical servers;
a processor;
a memory;
one or more modules stored in the memory and executable by the processor to:
receive a selection that identifies a physical location of one or more block devices to include in the virtual storage pool originally identified via a user interface that shows one or more available devices that may be included in the virtual storage pool, wherein:
the selection identifies a reference number of at least one physical server of the plurality of physical servers of a plurality of servers,
the selection identifies a sub-block number that identifies a sub- block of one or more sub-blocks associated with the at least one physical server of the plurality of physical servers;

the selection identifies a slot number identifying a slot of one or more slots in the at least one physical server of the plurality of servers, and each of the one or more slots are associated with the physical location of the one or more block devices, and the one or more slots corresponding to one or more sub-blocks and one or more slot numbers within the one or more sub-blocks of a plurality of sub-blocks by the reference number of the physical server, the sub-block number that identifies the sub-block of the one or more sub-blocks, and the slot number of the one or more slots;

generate a configuration file that includes the at least one physical server of the plurality of physical servers and the selection the selection of the one or more block devices as block device information that associates the physical location of the one or more block devices with the virtual storage pool;

access the configuration file, the configuration file including block device information; and automatically generate a virtual storage pool, the virtual storage pool generated from a plurality of block devices associated with the block device information and with the at least one physical server of the plurality of physical servers.

16. The system of claim 15, wherein the configuration file includes a physical location of a first block device of the plurality of block devices.

17. The system of claim 15, wherein the configuration file specifies the physical locations of each block device of the plurality of block devices in each virtual device.

18. The system of claim 15, wherein the configuration file specifies a type of virtual device.

19. The system of claim 15, the one or more modules further executable to translate the physical locations of each block device of the plurality of block devices to operating system addresses.

20. The system of claim 19, the one or more modules further executable to access a look-up table of operating system addresses based on block devices physical locations.

21. The system of claim 15, wherein the configuration application is executed by a controller in communication with multiple server devices.

* * * * *